United States Patent
Delmée et al.

(10) Patent No.: US 12,508,568 B2
(45) Date of Patent: Dec. 30, 2025

(54) FUNCTIONALIZED METAL POWDERS BY SMALL PARTICLES MADE BY NON-THERMAL PLASMA GLOW DISCHARGE FOR ADDITIVE MANUFACTURING APPLICATIONS

(71) Applicant: AM 4 AM S.A.R.L., Foetz (LU)

(72) Inventors: Maxime Delmée, Arion (BE); Grégory Mertz, Audun-le-Tiche (FR)

(73) Assignee: AM 4 AM S.À R.L., Foetz (LU)

( * ) Notice: Subject to any disclaimer, the term of this patent is extended or adjusted under 35 U.S.C. 154(b) by 0 days.

(21) Appl. No.: 17/604,043

(22) PCT Filed: Apr. 14, 2020

(86) PCT No.: PCT/EP2020/060401
§ 371 (c)(1),
(2) Date: Oct. 15, 2021

(87) PCT Pub. No.: WO2020/212312
PCT Pub. Date: Oct. 22, 2020

(65) Prior Publication Data
US 2022/0203446 A1  Jun. 30, 2022

(30) Foreign Application Priority Data

Apr. 16, 2019 (LU) .......................... 101177

(51) Int. Cl.
*B01J 19/08* (2006.01)
*B22F 1/052* (2022.01)
(Continued)

(52) U.S. Cl.
CPC .......... *B01J 19/088* (2013.01); *B01J 19/081* (2013.01); *B22F 1/052* (2022.01); *B22F 1/102* (2022.01);
(Continued)

(58) Field of Classification Search
CPC .... B01J 19/081; B01J 2219/0896; B22F 9/14; B22F 2301/052; B22F 2304/058;
(Continued)

(56) References Cited

U.S. PATENT DOCUMENTS

2008/0145553 A1* 6/2008 Boulos ................... B01J 19/088
                                                           118/620
2017/0368603 A1* 12/2017 Beals ..................... B33Y 10/00

FOREIGN PATENT DOCUMENTS

WO   2018046871 A1   3/2018

OTHER PUBLICATIONS

Iacob Constantin et.al. [WO2018046871A1] machine Translation (Year: 2018).*

(Continued)

*Primary Examiner* — Danielle M. Carda
*Assistant Examiner* — Nazmun Nahar Shams
(74) *Attorney, Agent, or Firm* — NIXON & VANDERHYE

(57) ABSTRACT

The present invention discloses a non-thermal plasma treatment of metal powders in order to improve their processability by additive manufacturing (AM). The invention consists in bonding primary particles constituted of metals or metal alloys to a plurality of secondary particles constituted of metals, metal alloys, ceramics or polymers by the mean of a non-thermal plasma treatment. The primary particles have a larger mean diameter than the secondary. Both particles are injected through a non-thermal plasma glow discharge and/or in its afterglow region (region downstream the plasma discharge) where their surfaces are (Continued)

cleaned by removing contaminants and/or oxide layer and activated to react between each other. The functionalized metal powders are then collected and afterwards processed by AM leading to high quality parts. The functionalized metal powders produced by this plasma treatment improve the processability of metal by AM.

11 Claims, 6 Drawing Sheets

(51) Int. Cl.
   *B22F 1/102* (2022.01)
   *B22F 1/16* (2022.01)
   *B22F 1/17* (2022.01)
   *B22F 9/14* (2006.01)
   *B22F 10/28* (2021.01)

(52) U.S. Cl.
   CPC .............. *B22F 1/16* (2022.01); *B22F 1/17* (2022.01); *B22F 9/14* (2013.01); *B22F 10/28* (2021.01); *B01J 2219/0896* (2013.01); *B22F 2301/052* (2013.01); *B22F 2304/058* (2013.01); *B22F 2304/10* (2013.01); *B22F 2304/15* (2013.01)

(58) Field of Classification Search
   CPC .............. B22F 2304/10; B22F 2304/15; B29C 64/153; B33Y 10/00
   See application file for complete search history.

(56) References Cited

OTHER PUBLICATIONS

Joris Kadok et.al. ["Functionalising Surfaces of 3D Printed Objects With an Integrated Low-Cost Atmospheric Pressure Micro Plasma Torch", Innovative materials for additive manufacturing, an ECI conference. Mar. 8-12, 2020. Santa Ana Pueblo, New Mexico]. (Year: 2020).*

International Search Report issued in connection with PCT Application No. PCT/EP2020/060401, dated May 26, 2020.

Christian Roth et al: "Nanoparticle Synthesis and Growth in a Continuous Plasma Reactor from Organosilicon Precursors", Plasma Processes and Polymers, vol. 9, No. 2, Feb. 7, 2012 (Feb. 7, 2012), pp. 119-134, XP055633173, DE.

Bardos L et al: "Cold atmospheric plasma: Sources, processes, and applications", Thin Solid Films, Elsevier, Amsterdam, NL, vol. 518, No. 23, Sep. 30, 2010 (Sep. 30, 2010), pp. 6705-6713, XP027248383.

William E. Frazier: "Metal Additive Manufacturing: A Review", Journal of Materials Engineering and Performance, vol. 23, No. 6, Apr. 8, 2014 (Apr. 8, 2014), pp. 1917-1928, XP055170181.

* cited by examiner

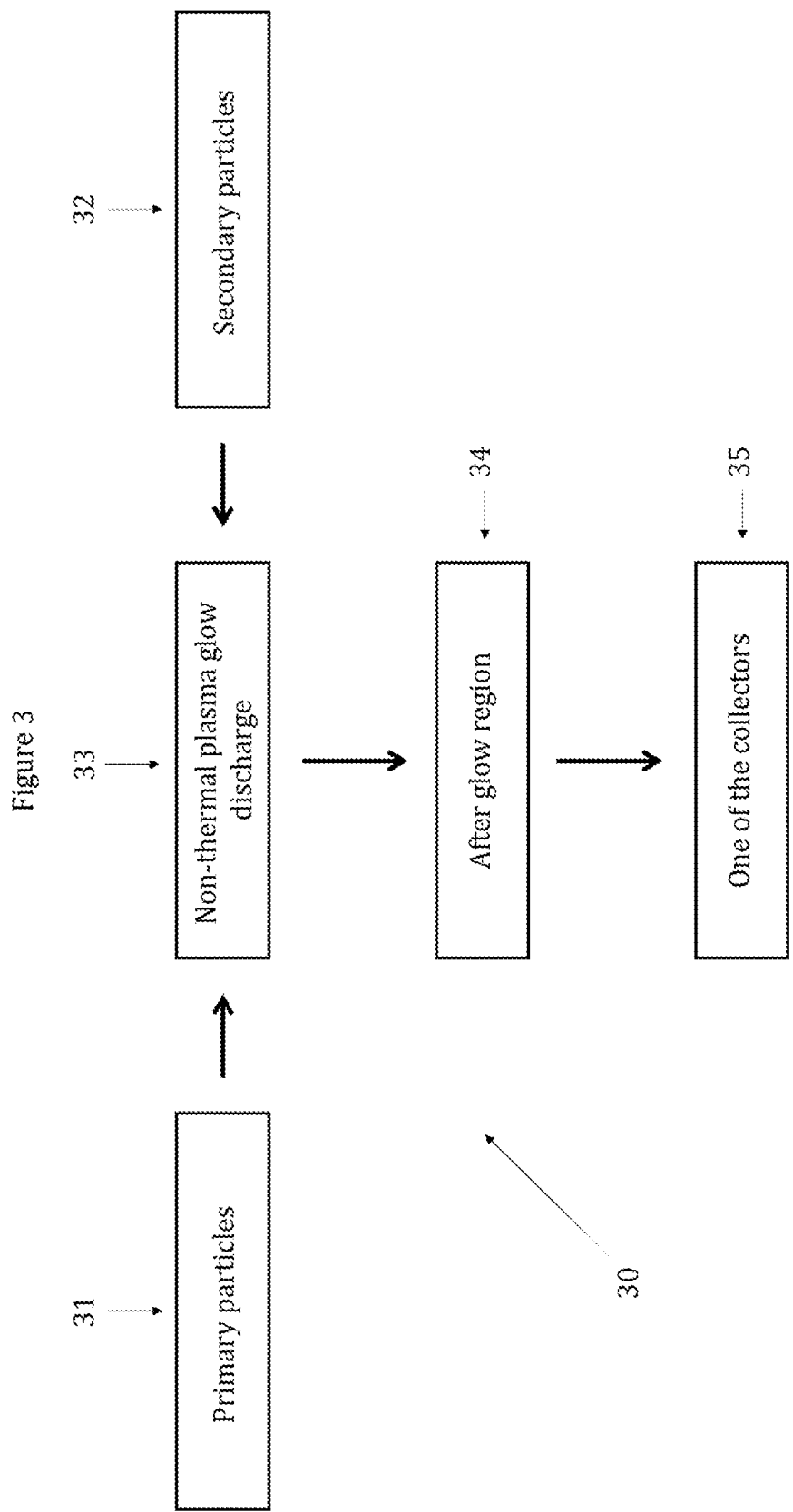

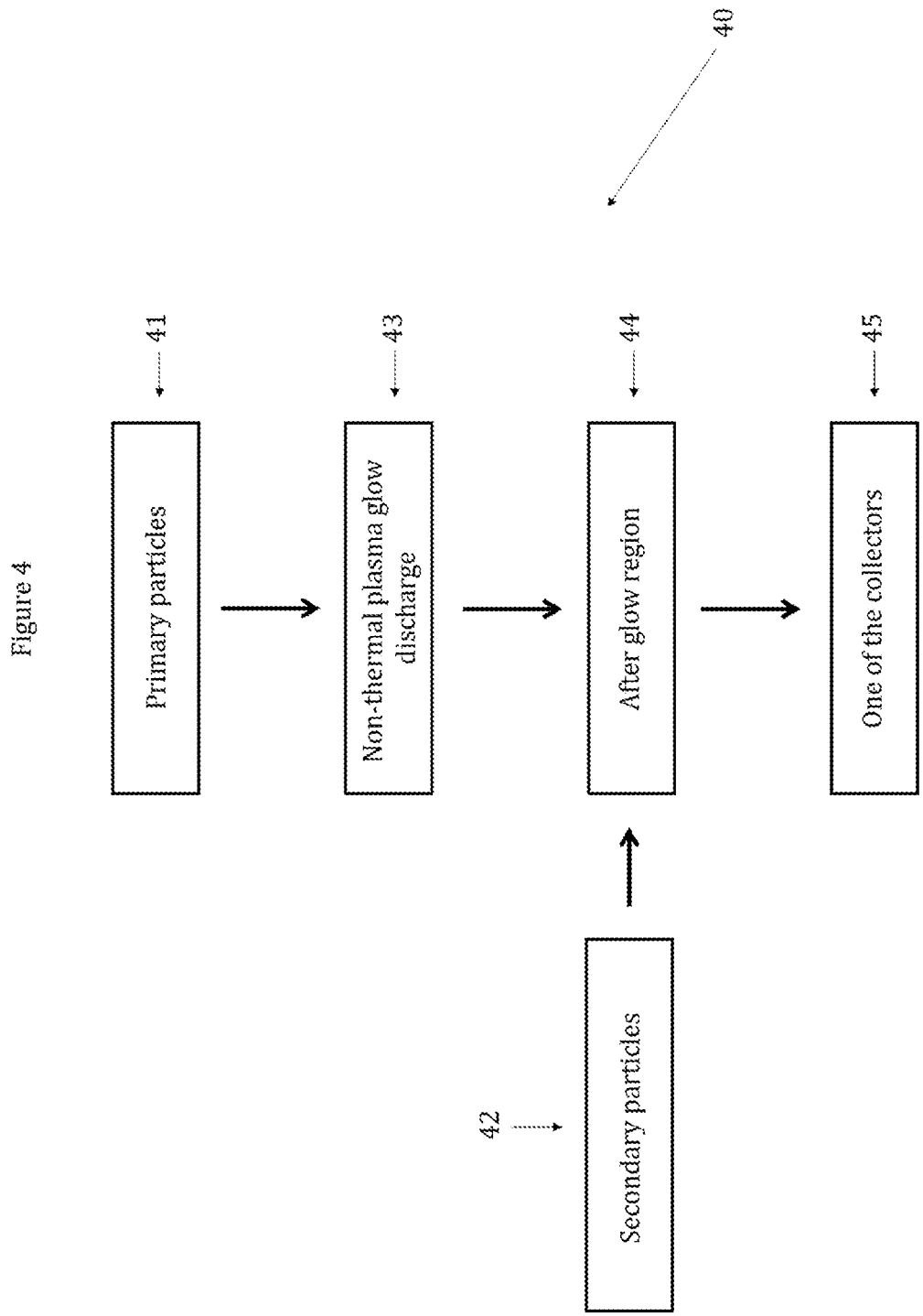

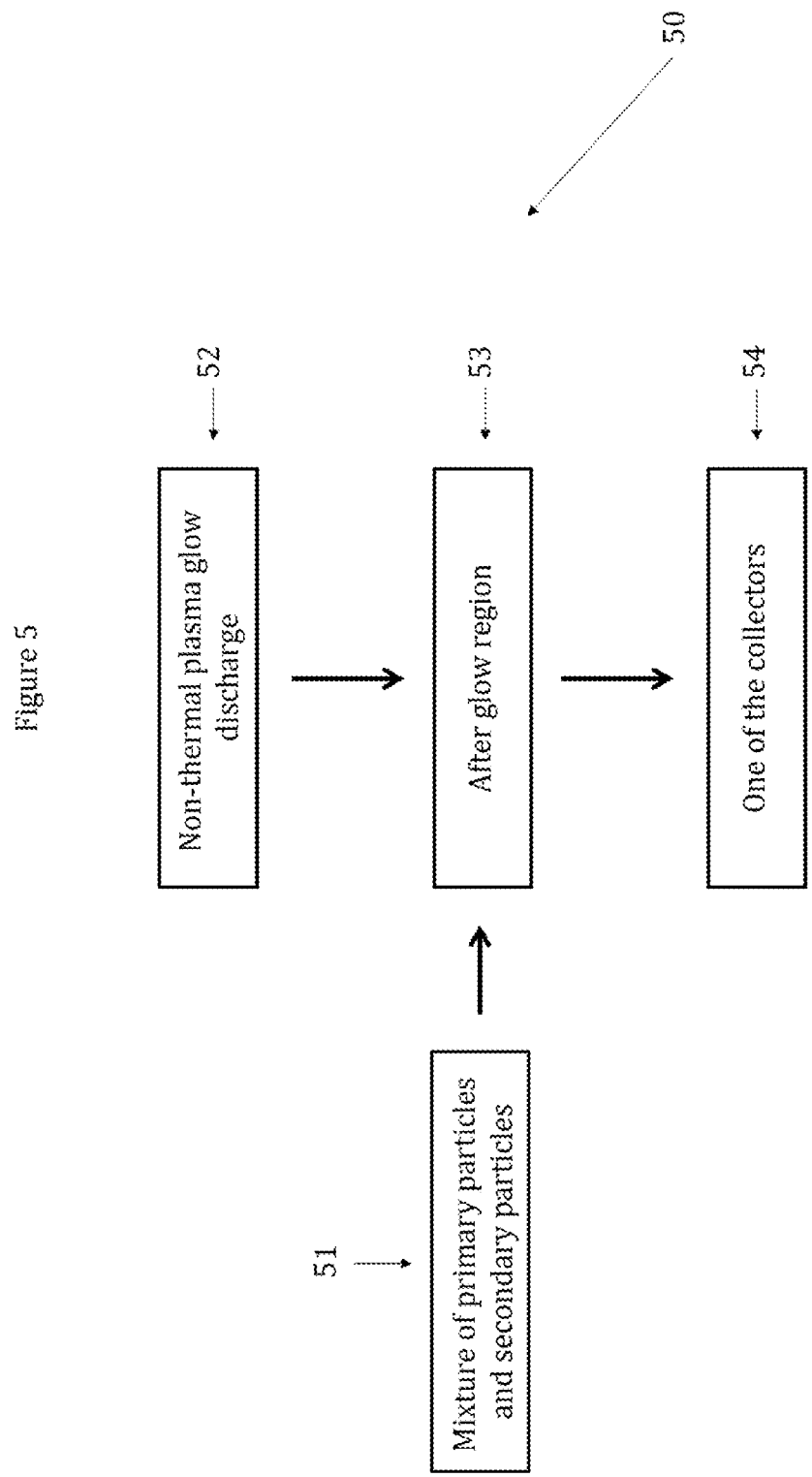

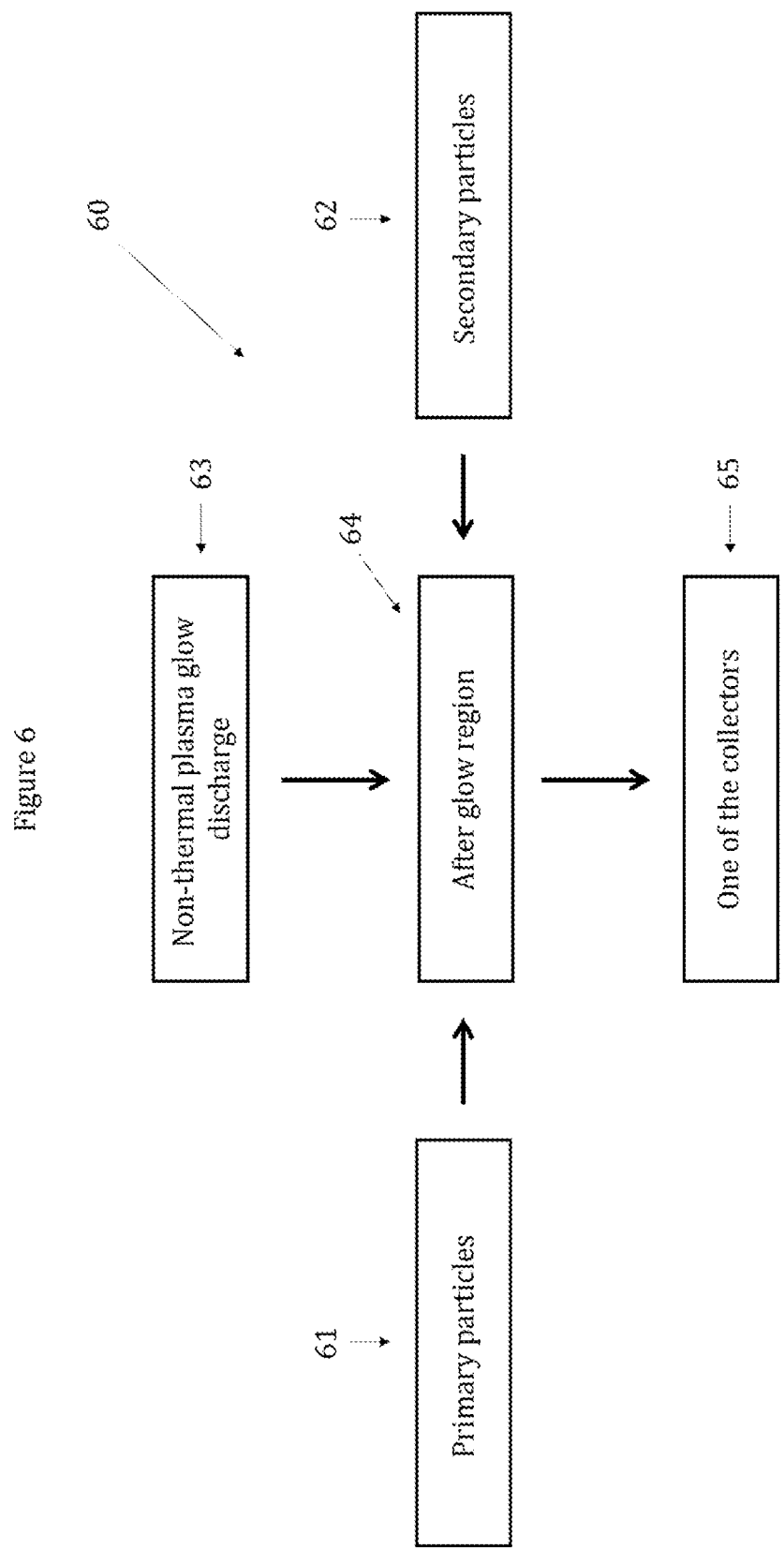

FUNCTIONALIZED METAL POWDERS BY SMALL PARTICLES MADE BY NON-THERMAL PLASMA GLOW DISCHARGE FOR ADDITIVE MANUFACTURING APPLICATIONS

FIELD OF THE INVENTION

The present invention relates to a method providing a non-thermal plasma process to produce metal or metal alloy functionalized powders. The present invention also relates to such a method to process the functionalized powders by melting or sintering AM processes.

More particularly, the present invention relates to a plasma treatment of metal powders in order to improve their processability by additive manufacturing.

BACKGROUND

Additive Manufacturing (AM) is an emerging technology for the processing of complex parts of a wide range of materials. AM processes consist in building up three-dimensional objects by stacking material layers one over the others in a defined pattern. Amongst the main advantages of AM like the broad panel of materials that could be used (polymers, ceramics, metals . . . ) and the large amount of available processing systems, the capacity to design complex parts which cannot be processed by conventional manufacturing attracts a particular interest of the industrial world.

In this field, three main categories of processes are commonly distinguished. First, the selective sintering or melting of a material powder bed by the mean of a laser, e.g. selective laser sintering (SLS), selective laser melting (SLM); or by an electron beam, e.g. electron beam melting (EBM). The high energy beam sinters or melts the powder to generate a first layer. Once the first layer is formed, a new powder layer is applied on the surface and the sintering or melting is performed to add a new layer on the top of the previous. The operation is repeated till the desired part is produced. Secondly, the directed energy deposition (DED) consists in sending a powder flow or a wire of material in the focal point of a laser or an electron beam. The material melt and is deposited on a surface to build the parts layer by layer. Thirdly, the article is formed by the deposition of extruded powder or wire of material on a surface. The extrusion nozzle is moving to trace the targeted parts.

The AM processes using high energy beam still exhibit some major challenges especially when applied to metal or metal alloy powders. Indeed, only few metal or metal alloy powders out of the more than 5000 used in the industry could be manufactured nowadays. Several gates have to be overcome to provide to the industry high performance metal alloys owning high strength, wear resistance or oxidation resistance properties.

One challenge is the high reflectivity of metal powders like aluminum or copper that makes them difficult to melt or sinter by laser sources. Indeed, the major part of the laser energy could be reflected in place of being absorbed to form the material. The process has to be performed at higher power and thus decreases its productivity.

Another challenge in metal powder AM is that some alloys such as aluminum undergo oxidation by moisture present in the air. This oxide layer hinders the correct sintering of the powder during processes. Powders have to be carefully stored before being used and systems have to be adapted to avoid this phenomenon which can lead to an increase of their prize.

Still another challenge is the formation of microstructures with cracks, voids and defects commonly encountered when metallic parts are produced by sintering processes. These defects are attributed to the thermodynamic of the solidification of the melted materials. Indeed, the sharp temperature gradient used by laser or electron beam leads to a high cooling rate. This high cooling rate induces anisotropic solidification generating cracks in the case of some alloys.

Finally, an important challenge is to avoid eutectic or peritectic decomposition which leads to multiphase fragile structures. Indeed, the high temperature reached by the metal alloy powders during sintering often rise to such decomposition. Decreasing the sintering temperature with sintering aids is a strategy often encountered in metallurgy.

In order to face these challenges, some compounds have been added to powders. For example, some patents highlight the use of sintering aids such as ceramic particles (U.S. Pat. No. 6,814,926, US20180161874, US20160175929, U.S. Pat. Nos. 7,070,734, 10,507,638 and 5,980,602A) to strengthen parts structure. Sintering aids act as grain refiners and nucleants decreasing sintering temperature and leading to isotropic solidification of the melted materials. These particles limit the amount of cracks and voids allowing a strong microstructure to be formed. However, a uniform dispersion of these aids are sometimes quite difficult to reach and defects are still present in the microstructures when parts are manufactured.

Indeed, by intimately mixing two powders by co-grinding (known as mecanosynthesis) under high energy modification of the powder surface can be obtained as described in U.S. Pat. Nos. 3,816,080, 3,591,362 and 4,706,894. However, the powders obtained does not reach the requirement needed for additive manufacturing because the surface of the powder are not perfectly recovered/functionalised. One solution developed is to attach sintering aids particles to the metal powder particles to improve the sintering aids dispersion. Some patents have shown that bonding smaller particles to metal particles powder increases their ability to be processed by AM (U.S. Pat. No. 10,005,127, WO2015036802, WO2015184474, US20080248306, EP1594679, US20170368603, US20150337423, US20160339517, EP3088104 and WO2018046871). The functionalization of metal particles powders addresses some issues about metal AM.

For example, it has been shown that the attachment of small particles on metal powder particles changes the chemical nature of their surface and their roughness. The change in surface roughness can be controlled by the distribution of smaller particles present on the powder particles. Moreover, the particles surface roughness have been shown to impact the reflectivity. Increasing the surface roughness lead to the reduction of the reflectivity (WO2015036802).

Another example is that the functionalization provides an additional protective layer to metal oxidation improving the easy handling of the powder and reducing the risk of defective parts due to a partial oxidation of the powders (US20170368603 and US20150337423).

Recently, different ways of attaching small particles on larger ones have been developed. Most of them involve chemical reaction (US20100209696), emulsion detonation (US20110183833), laser ablation (U.S. Pat. No. 7,527,824), heat treatment (U.S. Pat. No. 6,652,967), fluidized bed assisted by plasma torch and high energy grinder reactor (WO2018046871) and have been used for various applications as catalysis or as sensor. However, the main disadvantages or limitations of these production path are their multi-step processes, use a huge amount of solvent, hazardous chemicals, high temperature required, non-continuous process.

Plasma treatment to form such structured particles have also been considered. For example, supported palladium catalysts on carbon and aluminum have been obtained by injecting both precursors in a plasma discharge (U.S. Pat. No. 5,989,648). Nevertheless, most of the time such plasma processes are applied to monomer coated particles by injection of liquid precursors that polymerize in the discharge (US20080248306 and US20080145553). This in-situ polymerization in the discharge forming the structured particles does not permit to have a significant control on the materials produced. Another example has been described as the injection of primary particles in a plasma discharge in order to be decomposed and condense on secondary particles. Similarly to the previous example a correct control is difficult to reach as the particles characteristics are changed during the process. Finally, a patent described that functionalized powder have been produced by fluidized bed (WO2018046871). Functionalization particles are sprayed onto such powders circulating in fluidized bed under controlled temperature. Such reaction can be assisted by plasma torch to facilitate the diffusion of heteroatom such as nitrogen, carbon, bore or oxygen. Moreover hot plasma torch can be used to provide spheroidization of the powder. However in the previous patent the plasma do not allow the grafting of nucleants, sintering aids or small particles onto metal powder. Moreover, this process is non-continuous limiting the production rate.

To conclude, the interest in functionalized powders dedicated to AM is real and effective ways of production have to be developed. Some of them have already been set up, however, the need of one-step, solvent free and hazardous chemical free synthesis ways and with a better control of the particles features is crucial to extend the use of these kind of powders in AM.

SUMMARY OF THE INVENTION

It is against the background, and the limitations and problems associated therewith, that the present invention has been developed.

There is a need for a flight control system that provides for an improved processability of non-thermal plasma treatment for metal, metal alloy powders by additive manufacturing (AM).

Therefore, it is a primary objective of the present invention to provide a non-thermal plasma treatment provides for an improved reflectivity, sensitivity to oxidation and the presence of cracks, voids or defects in the structures encountered in metal AM limiting its use.

The aim of the present invention relates to the use of non-thermal plasma by activating the surface of both powder providing them enough energy to react together by electrostatic reaction. Indeed powders circulating in a continuous flow through the glow or afterglow plasma are excited creating positively or negatively charges onto their surfaces. In such application, primary particles can be positively or negatively charged depending of the chemical nature of the powder and secondary powders are oppositely charges conferring them probability to react with primary powders and covering them properly.

To achieve this, the method of the invention providing a non-thermal plasma process to produce metal or metal alloy functionalized powders, and the invention provides a method to process the functionalized powders by melting or sintering AM processes.

Advantageous embodiments of the invention are claimed in the dependent claims.

The present invention discloses a non-thermal plasma treatment of metal, metal alloy powders in order to improve their processability by additive manufacturing (AM). This treatment is especially facing challenges like high reflectivity, sensitivity to oxidation and the presence of cracks, voids or defects in the structures encountered in metal AM limiting its use.

In a first aspect, the present method provides a non-thermal plasma process to produce metal or metal alloy powders, said functionalized powders, composed of a plurality of metal or metal alloy particles, said primary particles, of a defined mean diameter attached to a plurality of metal, metal alloy, ceramic or polymer particles of a smaller defined mean diameter, said secondary particles. Secondary particles are distributed on the surface of primary particles. In some case the bonding ability of secondary particles on primary particles may be enhanced by organic linkers. Organic linkers are injected in the same way as the primary particles.

In a second aspect, the present non-thermal plasma process may involve: providing metal or metal alloy primary particles; providing metal, metal alloy, ceramic or polymer secondary particles; providing carrier gas streams to guide particles throughout all the process; providing a non-thermal plasma glow discharge allowing the particles to be cleaned, activated and react between each other; providing at least two containers positioned after the plasma discharge, said collectors, for receiving the functionalized powders.

In some embodiments, the plurality of primary particles is mixed with the plurality of secondary particles. The particles mixture is injected in a gas stream. This carrier gas stream guides the particles towards the non-thermal plasma glow discharge where the reaction occurs. Then, the functionalized powder composed of primary particles coated with a plurality of secondary particles is collected.

In some other embodiments, the plurality of primary particles is injected in a gas stream. The plurality of secondary particles is injected in another gas stream. These carrier gas streams guide both primary and secondary particles towards the non-thermal plasma glow discharge where the reaction occurs. Then, the functionalized powder composed of primary particles coated with a plurality of secondary particles is collected.

In some other embodiments, the plurality of primary particles is injected in a gas stream. This carrier gas stream guides the primary particles towards the non-thermal plasma glow discharge to be cleaned and activated. The plurality of secondary particles is injected in another gas stream. This second carrier gas stream guides the secondary particles towards a region downstream of the aforementioned non-thermal plasma glow discharge, said the afterglow region, where the reaction occurs. Then, the functionalized powder composed of primary particles coated with a plurality of secondary particles is collected.

In some other embodiments, the plurality of primary particles is mixed with the plurality of secondary particles. The particles mixture is injected in a gas stream. This carrier gas stream guides the particles towards the afterglow region where the reaction occurs. Then, the functionalized powder composed of primary particles coated with a plurality of secondary particles is collected.

In some other embodiments, the plurality of primary particles is injected in a gas stream. This carrier gas stream guides the primary particles towards afterglow region. The plurality of secondary particles is injected in another gas stream. This second carrier gas stream guides the secondary particles towards the afterglow region where the reaction occurs. Then, the functionalized powder composed of primary particles coated with a plurality of secondary particles is collected.

The present invention involves the generation of a non-thermal plasma glow discharge by electric fields such as RF, microwave, DC, etc. . . . applied to an incoming gas stream.

In some embodiments, the electric field is generated by the application of a tension between two electrodes. The voltage applied between these electrodes may vary between about 10 V to 100 kV. When an alternative current is used, the non-thermal plasma glow discharge may be generated by an electric field of frequency from about 1 Hz to about 900 MHz. The power applied to generate the non-thermal plasma glow discharge may be vary from about 10 to about 10000 W.

In some embodiments, this gas stream may be composed of helium, nitrogen, argon, hydrogen, carbon dioxide, carbon monoxide, nitric oxide, nitrous oxide, nitrogen dioxide, krypton, neon, xenon, or a combination of them. The gas stream may be fixed between about 0.1 to 5000 standard liter/minute. The pressure in the reactor where the non-thermal plasma glow discharge is generated may be selected between about 0.01 and about 30 atmosphere.

In a third aspect, the present invention involves the processing of the aforementioned functionalized powder by melting or sintering AM processes. AM processing is improved by this treatment and high quality parts are produced. These parts own enhanced properties such as mechanical strength and cracks, voids and defects free microstructures.

BRIEF DESCRIPTION OF THE DRAWINGS

In FIG. 1A, the secondary particles 2 are distributed on the surface of primary particles 1 without the use of organic linker 3. In FIG. 1B, the secondary particles 2 are distributed on the surface of primary particles 1 with organic linker 3. In FIG. 1C, the surface of primary particles 1 is totally covered by secondary particles 2 forming a layer of particles (without organic linker). In FIG. 1D, the surface of primary particles 1 is totally covered by secondary particles 2 forming at least two layers of particles (without organic linker).

FIG. 3 depicts an embodiment of the present invention 30 where the primary 31 and secondary particles 32 are poured in different containers and injected by two different ways (without being mixed) in the non-thermal plasma discharge 33 and pass by the afterglow region 34. Once the powder has been treated, it is amassed in a collector 35.

FIG. 4 depicts an embodiment of the present invention 40 where the primary particles 41 are injected in the non-thermal plasma discharge 43. The secondary particles 42 are injected in the afterglow region 44. Then, primary and secondary particles react in the afterglow region. Once the powder has been treated, it is amassed in a collector 45.

FIG. 5 depicts an embodiment of the present invention 50 where the primary and secondary particles are mixed together 51 before being injected directly in the afterglow region 53 generated by the non-thermal plasma glow discharge 52. Once the powder has been treated, it is amassed in a collector 54.

FIG. 6 depicts an embodiment of the present invention 60 where the primary 61 and secondary particles 62 are poured in different containers and injected by two different ways (without being mixed) in the afterglow region 64 generated by the non-thermal plasma discharge 63. Once the powder has been treated, it is amassed in a collector 65.

DETAILED DESCRIPTION OF ILLUSTRATIVE EMBODIMENTS

Figure 1:
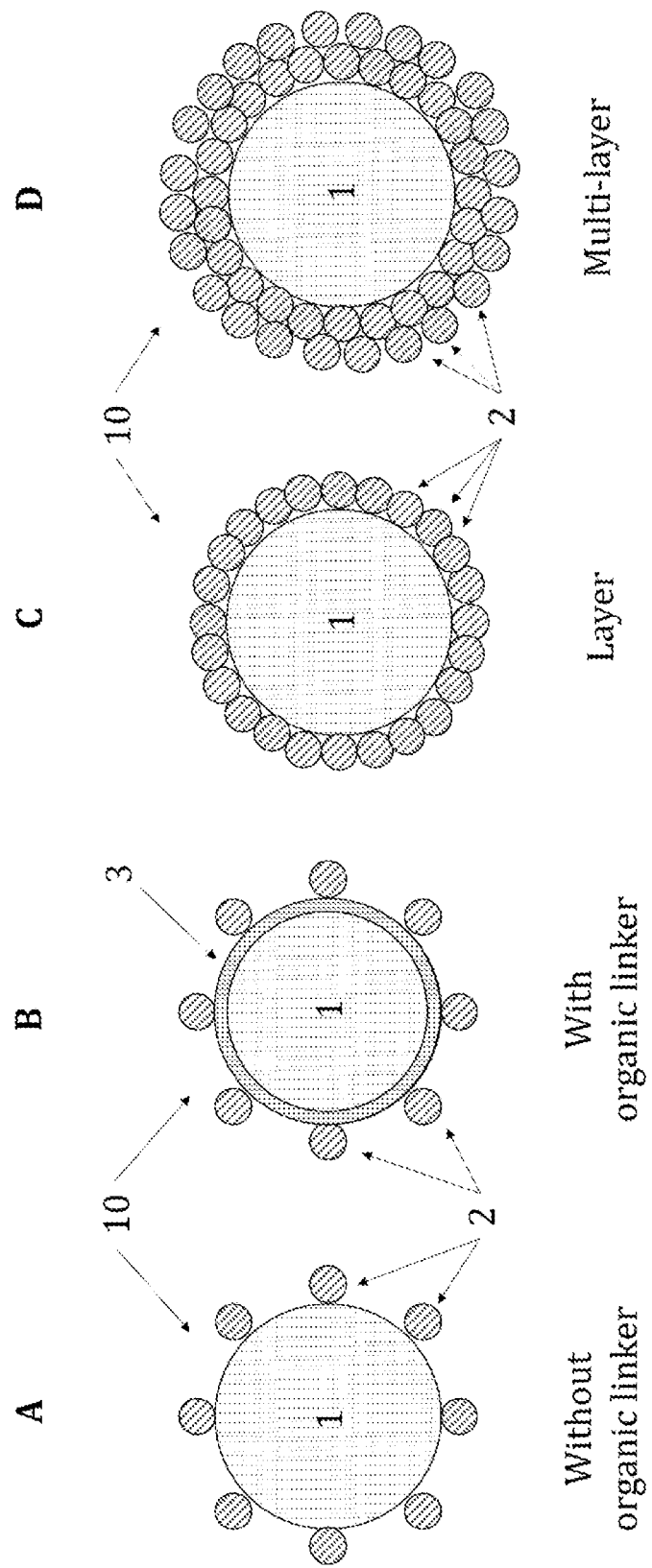
FIG. 1 illustrates different possible structures of powders 10 after the non-thermal plasma treatment.

The present invention discloses a non-thermal plasma treatment of metal, metal alloy powders in order to improve their processability by additive manufacturing (AM). This treatment is especially facing challenges like the high reflectivity, the sensitivity to oxidation and the presence of cracks, voids or defects in the structures encountered in metal AM limiting its use.

According to a first aspect of the present invention, the method provides a non-thermal plasma process to produce metal or metal alloy functionalized powders 10 composed of a plurality of particles, said primary particles 1, of a defined mean diameter attached to a plurality of metal, metal alloy, ceramic or polymer particles of a smaller defined mean diameter, said secondary particles 2. Secondary particles 2 are distributed on the surface of primary particles 1. In some embodiments, the primary particles are coated by organic linkers 3 to enhance the bonding ability of the secondary particles on the primary particles. Organic linkers 3 are injected in the same way as primary particles 1. In some preferred embodiments, process is performed without organic linkers.

The primary particles 1 of the metal, metal alloy powders may be composed of metals from following list: Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, Hf, Ta, W, Re, Os, Ir, Pt, Au, Tl, Pb, Bi, Po and combinations of them. The primary particles 1 may also contain alloying non-metal elements from the following list: B, C, N, O, Si, P, S, Ge, As, Se, Sb, Te, At and combinations of them.

In some preferred embodiments, primary particles 1 may be composed of aluminum alloys of the series 1000, 2000, 3000, 4000, 5000, 6000, 7000, 8000, 9000.

The primary particles 1 may be of various sizes and shapes. In some embodiments, primary particles 1 may be spherical, rod-shape or hollow. These primary particles 1 may have an aspect ratio from 1:1 to 200:1. This aspect ratio defines the ratio between the longest dimension and the shortest. In some other embodiments, primary particles 1 may have an average mean diameter between 0.01 µm and 1000 µm.

The primary particles 1 composed of metals and metal alloys may be produced from various synthesis ways including but not limited to comminution of solid metal parts, laser ablation of metal target, plasma synthesis, electrodeposition, precipitation of metallic salt, reduction of metallic oxide, thermal decomposition of metallic compounds or gas atomization.

The secondary particles 2 may be composed of metals, metal alloys, ceramics or polymers. Metals may be selected from the following list: Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, Hf, Ta, W, Re, Os, Ir, Pt, Au, Tl, Pb, Bi, Po and combinations of them. The metal secondary particles 2 may contain non-metal elements from the following list: B, C, N, O, Si, P, S, Ge, As, Se, Sb, Te, At and combinations of them. Ceramic secondary particles 2 may be composed of carbides, nitrides, hydrides, oxides or borides of metals from the following list: Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, Hf, Ta, W, Re, Os, Ir, Pt, Au, Tl, Pb, Bi, Po and combinations of them. Polymer secondary particles 2 may be selected from the following families list: polyethylene, polypropylene, polystyrene, polyurethane, polybutadiene, polyacrylic acid, polyethylene terephthalate, polyamide, polyimide, polyacrylonitrile, polyvinyl, polyester, polyisoprene, polychloroprene, polyacetal, polyaniline, polysiloxane, polyphosphazene, polyacrylate, polymethacrylate, polyacetate, polycarbonate, derivatives of these polymers and copolymers from them.

The secondary particles 2 may be of various sizes and shapes. In some embodiments, secondary particles 2 may be spherical, rod-shape or hollow. These secondary particles 2 may have an aspect ratio from 1:1 to 200:1. In some other embodiments, secondary particles 2 may have an average mean diameter between 0.002 µm and 900 µm. However, secondary particles 2 are always smaller than primary particles.

The secondary particles 2 composed of metals and metal alloys may be produced from various synthesis ways including but not limited to comminution of solid metal parts, electrodeposition, precipitation of metallic salt, reduction of metallic oxide, thermal decomposition of chemicals or gas atomization.

The secondary particles 2 composed of ceramics may be produced from various synthesis ways including but not limited to hydrothermal synthesis, sol-gel synthesis, thermal decomposition of chemicals, precipitation synthesis, evaporative condensation or solvent removal method.

The secondary particles 2 composed of polymers may be produced from various synthesis ways including but not limited to plasma polymerization, spray drying method, emulsion synthesis, heterophase polymerization or by conventional wet chemistry.

The secondary particles 2 may be distributed on the surface of the primary particles 1 (FIGS. 1A and 1B). In some embodiments the primary particles 1 may have a percentage of surface coverage between 0.1 and 100%. 100% coverage expresses that the primary particles 1 are coated by a layer of secondary particles 2 (FIG. 1C). This layer may have a thickness from about 0.002 µm and about 900 µm. The primary particles 1 may be coated by between 1 to 100 layers of secondary particles 2 (FIG. 1D).

In some embodiments, a plurality of secondary particles 2 with different composition may coat the primary particles 1. The plurality of secondary particles 2 may be constituted of different metals, metal alloys, ceramics or polymers.

In some embodiments organic linkers 3 may be used to enhance the attachment of secondary particles 2 on primary particles 1. These organic linkers 3 located at the surface of the primary particles 1 may contain alcohol, aldehyde, amine, epoxy, ketones, carboxylic acid, thiol or silanes functional groups. These organic linkers 3 may be selected from the following non-exhaustive organic compounds list: glycerol, heparin, maleic anhydride, chondroitine sulfate, heparin, sodium citrate, mannan sulfate, dextran sulfate, 1-carrageenan. These organic linkers 3 may be selected from the following non-exhaustive polymers list: polyacrylic acid, polyalkyl amine, polyvinyl pyrrolidone, poly quaternary ammonium salt, polyglutamic acid, polyaspartic acid, polylysine and copolymers or combination of them.

The AM processing of powders composed of primary particles 1 coated by a plurality of smaller secondary particles 2 is an appropriate answer towards challenges in this field.

In a first time, the secondary particles 2 distributed on the surface of the primary particles 1 may change the reflectivity of the powder. Indeed, some metals or metal alloys such as aluminum alloy or copper own a high reflectivity to a large range of wavelength. Highly reflective powders reflect the most important part of the incident laser beam. This reflection hinders the particles to melt. In order to correctly manufacture parts, the laser power need to be increased and by this way the process is less efficient. The fact of distributing less reflective particles on their surface decreases the global reflectivity and the energy absorption of the powders without changing its bulk composition and its properties. Moreover, secondary particles 2 form a granular layer on the surface of primary particles 1 which decreases by a larger amount the reflectivity than a smooth layer of the same materials. Indeed, a rough surface reduces the regular reflectivity of the surface and enhances the absorption of the laser beam by the materials.

In a second time, forming a layer of secondary particles 2 surrounding the primary particles 1 may provide a protection against surface oxidation by the external moisture. The oxidation of metal powder is a significant problem in AM processes. Indeed, the thick oxide layer formed may, in some case, inhibits the correct sintering or melting. For example, aluminum alloys are well known to be highly sensitive to moisture and an alumina passivative layer forms immediately when exposed to air. Alumina shell owns a high melting point and hinders the grains growth and diffusion at boundaries when exposed to the laser beam. Processing of such powders leads to fragile or multi-phase parts with the presence of cracks, voids and defects. The distribution of secondary particles 2 on the primary particles 1 acts as barrier against air moisture and avoids oxide layer formation. Secondary particles 2 with similar or lower melting point than primary particles allow grain growth and diffusion at boundaries and so promote the easy handling and processability of such powders.

In a third time, secondary particles 2 attached to primary particles 1 may act as sintering aids and nucleants improving/strengthening the final structure of sintered parts. The sharp temperature gradient used to process parts by AM leads to high heating and cooling rate. Some metal powders do not tolerate this high cooling rate and cracks appear in the microstructure during the solidification step. This solidification dynamic is highly anisotropic and creates a heterogeneous growth that lead to the presence of cracks and voids making fragile parts. In the present invention, secondary particles 2 act as sintering aids and nucleants leading to isotropic solidification of the melted materials. Secondary particles 2 prevent the formation of cracks, voids and defects in the microstructure. Moreover, bonding secondary particles 2 to primary ones 1 ensures a homogeneous distribution of sintering aids all over the materials which could sometimes be difficult to reach.

Finally, secondary particles 2 may act as sintering aids and decrease the sintering temperature of powders. The high temperature used in AM process to sinter metal powder could lead to eutectic or peritectic decomposition and multiphase structures formation. Sintering aids are used to decrease the sintering temperature of materials but also to strengthen parts structures. Secondary particles 2 decrease the sintering temperature of primary particles 1 avoiding decomposition and multiphase structures. To conclude, secondary particles 2 ensure that the alloy bulk composition of the parts produced is the same as the starting materials.

According to a second aspect of the present invention, the present non-thermal plasma process may involve: providing metal or metal alloy primary particles; providing metal, metal alloy, ceramic or polymer secondary particles; providing carrier gas streams to guide particles throughout all the process; providing a non-thermal plasma glow discharge allowing the particles to be cleaned, activated and react between each other; providing at least two containers positioned after the plasma discharge, said collectors, for receiving the functionalized powders.

In the following section, technical terms will be introduced and detailed to facilitate the understanding of skilled-person. The description of the hereafter concepts are described for the all document.

"Non-thermal plasma glow discharge" describes an ionized gas, said plasma, generated by applying an intense electric field to a gas. This electric field may be generated using radio frequency, microwave or direct current. To generate this electrical field, high voltage is applied between two electrodes. The gap between both electrodes is fed with a gas which under the electric field is ionized generating a plasma, said plasma discharge. The voltage is selected in a range below the formation of an electric arc in order to conserve a non-thermal plasma discharge (below 80° C.). This plasma is composed of high energy species such as free electrons, ions, radicals, excited species and UV-rays. The reactive species present in the plasma discharge may be used to etch or activate materials surface but also to initiate chemical reactions. Some common uses of non-thermal plasma glow discharge applied to particles are, for example, the removal of layers and contaminants by plasma etching, surface activation in view of further treatments, particles formation from liquid monomers by homogeneous polymerization and growth or functionalization of particles by attaching compounds to the surface.

"Afterglow region" describes a zone downstream the non-thermal plasma glow discharge. This particular region is composed of reactive species such as free electrons, ions, radicals, excited species and UV-rays. These species diffuse or are brought by the gas stream from the non-thermal plasma glow discharge to this particular region. The reactive species present in the plasma discharge may be used to etch or activate materials surface but also to initiate chemical reactions. The most common application of afterglow region are mostly the same as the non-thermal plasma glow discharge. However, the amount of reactive species and their energies are lower in this region and this zone could be considered as less reactive. In the same time, the absence of intense electric field in this region facilitates the treatment of particles sensitive to electric field such as some conductive particles. Indeed, high electric field may lead to parasite aggregation or deposition of conductive particles.

"Carrier gas stream" describes a gas flow used to guide particles from their container through the different plasma region and towards the collectors. Particles are mixed with the gas stream by the means of injectors and fed towards different plasma regions. The carrier gas stream pass by the gap between the electrodes. This gas stream serves also as gas to generate the plasma discharge. Finally the treated particles are driven to one of the collectors.

Figure 2:
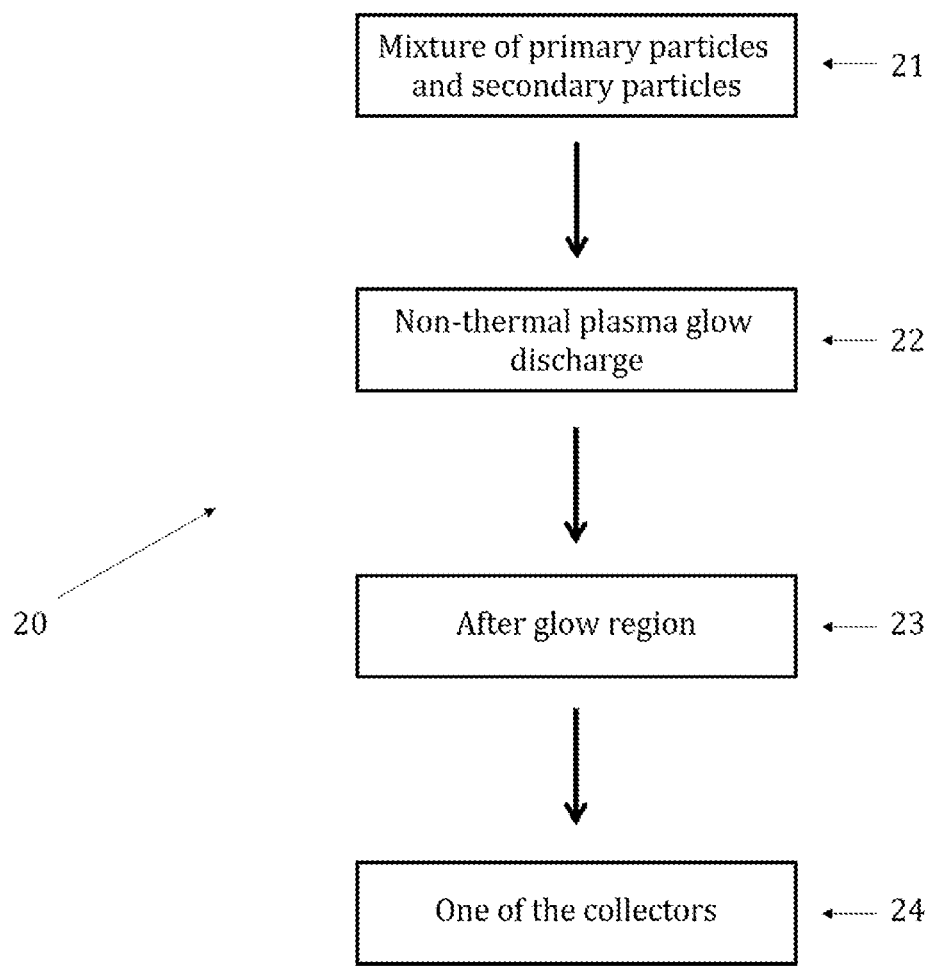
FIG. 2 depicts an embodiment of the present invention 20 where the primary and secondary particles are mixed together 21 before being injected in the non-thermal plasma glow discharge 22 and passing by the afterglow region 23. Once the powder has been treated, it is amassed in a collector 24.

In an embodiment 20 (FIG. 2), the plurality of primary particles 1 is mixed with the plurality of secondary particles 2. The mixture of particles may be composed of different ratio of primary and secondary particles. The particles ratio may be selected from 0.5% of secondary particles and 99.5% of primary particles to 99% of secondary particles and 1% of primary particles.

First, the particles mixture 21 is poured in a container before being mixed with a carrier gas stream by an injector. The gas carrier stream may contain from 0.1 $ng/cm^3$ to 2 $g/cm^3$ of particles. In certain embodiments, organic linkers 3 may be injected in the same carrier gas stream if necessary. This carrier gas stream guides the particles mixture towards the non-thermal plasma glow discharge 22. In the plasma discharge, the plasma reactive species interact with the primary and secondary particles. The surfaces of both family of particles are cleaned and activated by the plasma and become reactive and the plurality of secondary particles is bonded to the primary particles by such interaction. Then, the carrier gas stream propagates the particles towards the afterglow region 23 where the bonding reaction can still occur. Finally, the functionalized powder 10 composed of primary particles 1 coated with a plurality of secondary particles 2 is guided to one of the collectors 24 by a unique carrier gas.

In another embodiment 30 (FIG. 3), the plurality of primary particles is poured in a first container 31 before being mixed with a first carrier gas stream by an injector. The first gas carrier stream may contain from 0.1 $ng/cm^3$ to 2 $g/cm^3$ of particles. In certain embodiments, organic linkers 3 may be injected in the same carrier gas stream if necessary. The plurality of secondary particles is poured in a second container 32 before being mixed with a second carrier gas stream by another injector. The second gas carrier stream may contain from 0.1 $ng/cm^3$ to 2 $g/cm^3$ of particles. The carrier gas streams guide primary and secondary particles towards the non-thermal plasma glow discharge 33. The carrier gas stream mixture may be constituted to from 1% of the primary carrier gas stream and 99% of the secondary carrier gas to 99.9% of the primary carrier gas stream and 0.1% of the secondary carrier gas. In the plasma discharge, the plasma reactive species interact with the primary and secondary particles. The surfaces of both family of particles are cleaned and activated by the plasma and become reactive and the plurality of secondary particles is bonded to the primary particles by such interaction. Then, the carrier gas stream propagates the particles mixture towards the afterglow region 34 where the bonding reaction can still occur. Finally, the powder 10 composed of primary particles 1 coated with a plurality of secondary particles 2 is guided to one of the collectors 35 by a unique carrier gas.

In another embodiment 40 (FIG. 4), the plurality of primary particles is poured in a first container 41 before being mixed with a first carrier gas stream by an injector. The first gas carrier stream may contain from 0.1 $ng/cm^3$ to 2 $g/cm^3$ of particles. In certain embodiments, organic linkers 3 may be injected in the same carrier gas stream if necessary. This first carrier gas stream guides the primary particles towards the non-thermal plasma glow discharge 43. In the non-thermal plasma glow discharge, the plasma reactive species interact with the primary particles. Their surfaces are cleaned and activated by the plasma and become reactive. Then, the activated primary particles are guided by the carrier gas stream towards the afterglow region 44. In the same time, the plurality of secondary particles is poured in a second container before being mixed with a second carrier gas stream by another injector. The gas second carrier stream may contain from 0.1 ng/cm³ to 2 g/cm³ of particles. This second carrier gas stream guides the secondary particles towards the afterglow region 44. The carrier gas stream mixture may be constituted to from 1% of the primary carrier gas stream and 99% of the secondary carrier gas to 99.9% of the primary carrier gas stream and 0.1% of the secondary carrier gas. In the afterglow region, the secondary particles interact with plasma reactive species diffusing from the non-thermal plasma glow discharge and with activated primary particles. This interaction lead to the bonding of the plurality of secondary particles to the primary particles. Finally, the powder 10 composed of primary particles 1 coated with a plurality of secondary particles 2 is guided to one of the collectors by a unique carrier gas.

In an embodiment 50 (FIG. 5), the plurality of primary particles 1 is mixed with the plurality of secondary particles 2. The mixture of particles may be composed of different ratio of primary and secondary particles. The particles ratio may be selected from 0.5% of secondary particles and 99.5% of primary particles to 99% of secondary particles and 1% of primary particles.

First, the particles mixture is poured in a container 51 before being mixed with a carrier gas stream by an injector. The gas carrier stream may contain from 0.1 ng/cm³ to 2 g/cm³ of particles. In certain embodiments, organic linkers 3 may be injected in the same carrier gas stream if necessary. This carrier gas stream guides the particles mixture towards the afterglow region 53. In the afterglow region, the plasma reactive species diffusing from the non-thermal plasma glow discharge 52 interact with the primary and secondary particles. The surfaces of both family of particles are cleaned and activated by the plasma and become reactive and the plurality of secondary particles is bonded to the primary particles by this interaction. Finally, the powder 10 composed of primary particles 1 coated with a plurality of secondary particles 2 is guided to one of the collectors 54 by a unique carrier gas.

In another embodiment 60 (FIG. 6), the plurality of primary particles is poured in a first container 61 before being mixed with a first carrier gas stream by an injector. The first gas carrier stream may contain from 0.1 ng/cm³ to 2 g/cm³ of particles. In certain embodiments, organic linkers 3 may be injected in the same carrier gas stream if necessary. The plurality of secondary particles is poured in a second container 62 before being mixed with a second carrier gas stream by another injector. The second gas carrier stream may contain from 0.1 ng/cm³ to 2 g/cm³ of particles. The carrier gas streams guide primary and secondary particles towards the afterglow region 64. The carrier gas stream mixture may be constituted to from 1% of the primary carrier gas stream and 99% of the secondary carrier gas to 99.9% of the primary carrier gas stream and 0.1% of the secondary carrier gas. In the afterglow region, the plasma reactive species diffusing from the non-thermal plasma glow discharge 63 interact with the primary and secondary particles. The surfaces of both family of particles are cleaned and activated by the plasma and become reactive and the plurality of secondary particles is bonded to the primary particles by this interaction. Finally, the powder 10 composed of primary particles 1 coated with a plurality of secondary particles 2 is guided to one of the collectors 65 by a unique carrier gas.

The present invention involves the generation of a non-thermal plasma glow discharge by electric fields such as RF, microwave, DC, etc. . . . applied to an incoming gas flow.

In some embodiments, the electric field is generated by the application of a tension between two electrodes. The voltage applied between these electrodes may vary between about 10 V to 100 kV. When an alternative current is used, the non-thermal plasma glow discharge may be generated by an electric field of frequency from about 1 Hz to about 900 MHz. The power applied to generate non-thermal plasma glow discharge may be vary from about 10 to about 10000 W.

In some embodiments, the gas stream injected between the electrodes may be composed of helium, nitrogen, argon, hydrogen, carbon dioxide, carbon monoxide, nitric oxide, nitrous oxide, nitrogen dioxide, krypton, neon, xenon, or a combination of them. The gas flow may be fixed between about 0.1 to 5000 standard liter/minute. The pressure in the reactor where the non-thermal plasma glow discharge is generated may be selected between about 0.01 and about 30 atmosphere. In preferred embodiments, the reactor is operating at atmospheric pressure.

The present invention describes a non-thermal plasma glow discharge process to produce primary particles bonded to secondary smaller particles to enhance AM processability. The present invention owns several advantages compared to the state of the art in this AM field.

First, the present process avoids the use of solvent and hazardous chemicals. Indeed, this non-thermal plasma glow discharge process is only operating with gases, particles and in some embodiments, non-toxic organic linkers.

In a second time, the process avoids multi-steps production composed of wet chemistry and a drying and/or purification step. Indeed, the functionalized powders are produced by injecting particles in the plasma reactor and collecting them at the exit of this one. Moreover, the contaminants and oxide layers present on the particles surface may be removed by the etching ability of plasma discharge. The particles are cleaned, depassivated and bonded together in the same process leading to an important gain in process time.

Finally, the present process may operate in a continuous mode which allows to scale up this technology and fulfill industrial demand for metal powders. Indeed, several collectors are implemented at the exit of the plasma reactor. One of the collectors may receive the functionalized powders when the others are emptied and cleaned. Once the collector used is full, gas stream charged of functionalized powder may be oriented to another collector in order to received particles in a continuous way.

According to a third aspect of the invention, the present invention involves the processing of the aforementioned functionalized powders by melting or sintering AM processes. AM processing is improved by this treatment and high quality parts are produced therefrom. These parts own enhanced properties such as mechanical strength and cracks, voids and defects free microstructures.

In order to form high quality parts from the aforementioned powders, AM processes such as selective laser sintering (SLS), selective laser melting (SLM), electron beam melting (EBM) or directed energy deposition (DED) may be used. In a preferred embodiment, sintering processes are mainly selected over melting processes for metal alloys as sintering is softer and alloy decompositions do not occur.

In an embodiment, AM process for functionalized powders consists in:

First, sintering or melting of a certain quantity of functionalized powder provided by the exposition to a high energy beam such as laser or electron beam. This high energy beam melts entirely or partially the powder in a desired pattern.

In a second time, the melted material is solidifying leading to the formation of a first solid layer of a desired pattern.

In a third time, a new quantity of functionalized powder is provided and the first and second steps are repeated until the targeted part is achieved.

Functionalized powders may be provided by continuously blowing powders through a nozzle in the spot where the materials have to be deposited, or by filling a powder bed and successively carrying out a new powder layer after a solid layer has been formed.

The AM processing of such functionalized powders leads to good mechanical resistance and cracks, voids and defects free parts. The secondary particles are acting as sintering aids and nucleants avoiding cracks, voids and defects formation. Indeed, secondary particles enhance the isotropy of the solidification. The lack of oxide layer and contaminants at the primary particles surface also play an important role in the processing of high quality parts.

Moreover, the use of functionalized powders composed of primary particles constituted of metal or metal alloy coated of secondary smaller particles constituted of metal, metal alloy, ceramic or polymer allows the AM process to be more efficient in two manners.

First, the secondary particles present on the surface of primary particles may decrease the reflectivity of the powders. This drop-off reflectivity permits to decrease the beam energy.

And in a second time, the protective layer to oxidation formed by secondary particles allows an easier handling of materials before the process. Especially for powder bed process were the bed has to be install in an inert atmosphere.

To conclude, the present invention is composed of three main aspects. In a first time, the characteristics of powder produced by this method and their advantages for AM processes are described. In a second time, the non-thermal plasma glow discharge process, its variations and the interest for this technology are presented. Finally, the AM process of such treated powders and the gain in efficiency is explained.

Although the invention has been described in conjunction with specific embodiments thereof, it is evident that many alternatives, modifications and variations will be apparent to those skilled in the art. Accordingly, it is intended to embrace all such alternatives, modifications and variations that fall within the appended claims.

The invention claimed is:

1. A method of providing a non-thermal plasma process to produce metal or metal alloy functionalized powders composed of a plurality of particles, including metal or metal alloy primary particles being attached to a plurality of smaller particles including metal, metal alloy, ceramic or polymer secondary particles, said secondary particles being distributed on the surface of e primary particles for additive manufacturing applications, the non-thermal plasma method comprising:
   providing carrier gas streams to guide the particles throughout all the process;
   providing a non-thermal plasma glow discharge and an afterglow region downstream of said non-thermal plasma glow discharge;
   providing the metal alloy primary metal or particles, guided via the carrier gas streams, to the non-thermal plasma glow discharge to become activated primary particles;
   providing the activated metal or metal alloy primary particles, guided via the carrier gas streams, to the afterglow region;
   providing the metal, metal alloy, ceramic or polymer secondary particles, guided via the carrier gas streams, to the afterglow region to interact with the activated primary particles to produce the functionalized powders composed of the activated primary particles and the secondary particles; and
   providing the functionalized powders by one of: (i) continuously blowing the functionalized powders through a nozzle in a spot where the functionalized powders are to be deposited, and (ii) filling a powder bed and successively carrying out a new powder layer after a solid layer is formed,
   wherein the functionalized powders are processed by:
      i) a first step of sintering or melting a specific quantity of functionalized powders provided by exposition to a high energy beam, the high energy beam entirely or partially melting functionalized powders in a specific pattern,
      ii) a second step of solidifying the melted quantity of functionalized powders, leading to the formation of a first solid layer of a desired pattern, and
      iii) a third step of providing a new quantity of functionalized powders, the first and the second steps being repeated until a targeted part is achieved.

2. The method of claim 1, wherein the primary particles are injected in a first carrier gas stream of the carrier gas streams, the first carrier gas stream guiding the primary particles towards the non-thermal plasma glow discharge to be cleaned and activated, the secondary particles are injected in a second carrier gas stream of the carrier gas streams, the second carrier gas stream guiding the secondary particles towards the afterglow region downstream of the non-thermal plasma glow discharge, a reaction occurring at the afterglow region, and
   the functionalized powder composed of the primary particles coated with the secondary particles then being collected.

3. The method of claim 1, wherein the primary particles are injected in a first carrier gas stream of the carrier gas streams, first carrier gas stream guiding the primary particles towards afterglow region, the secondary particles being injected in a second carrier gas stream, the second carrier gas stream guiding the secondary particles towards the afterglow region where a reaction occurs, and
   the functionalized powder composed of the primary particles coated with the secondary particles then being collected.

4. The method of claim 1, wherein the primary particles are aluminum alloys of the series 1000, 2000, 3000, 4000, 5000, 6000, 7000, 8000.

5. The method of claim 1, wherein the primary particles have an average mean diameter between 0.01 μm and 1000 μm.

6. The method of claim 1, wherein the secondary particles have an average mean diameter between 0.002 μm and 900 μm, the secondary particles being always smaller than the primary particles.

7. The method of claim 1, further comprising applying power to generate an electric field which produces the non-thermal plasma glow discharge varying from about 10 to about 10000 W.

8. The method of claim 1, wherein the carrier gas flow is composed of helium, nitrogen, argon, or a combination thereof.

9. The method of claim 1, wherein the carrier gas flow is fixed between about 0.1 to 5000 standard liter/minute.

10. The method of claim 1, wherein pressure in a reactor of the non-thermal plasma process where the non-thermal plasma glow discharge is generated is selected between about 0.01 and about 30 atmosphere.

11. The method of claim 1, wherein the secondary particles act as sintering aids and nucleants avoiding cracks, voids and defects formation, the secondary particles enhancing the isotropy of the solidification.

* * * * *